J. J. Rose.
Wheel Cultivator.
N° 93,749. Patented Aug. 17, 1869.

Witnesses:
W. C. Ashkettle
Wm A Morgan

Inventor:
J. J. Rose
per Munn &Co
attorneys

UNITED STATES PATENT OFFICE.

JOHN J. ROSE, OF ELMWOOD, ILLINOIS.

IMPROVEMENT IN CULTIVATORS.

Specification forming part of Letters Patent No. 93,749, dated August 17, 1869.

*To all whom it may concern:*

Be it known that I, J. J. ROSE, of Elmwood, in the county of Peoria and State of Illinois, have invented new and useful Improvements in Cultivators; and I do hereby declare that the following is a full, clear, and exact description thereof, which will enable those skilled in the art to make and use the same, reference being had to the accompanying drawings, forming part of this specification, in which—

Figure 1:
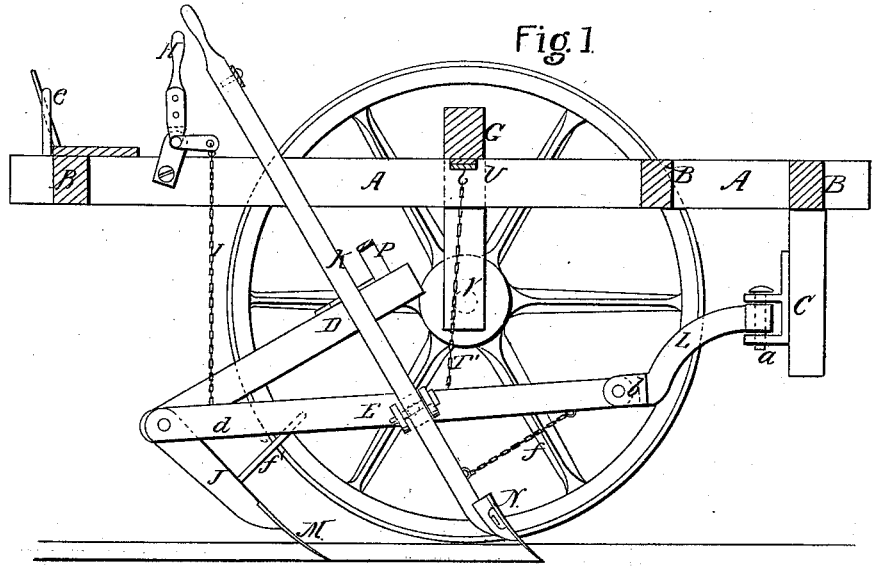
Figure 2:
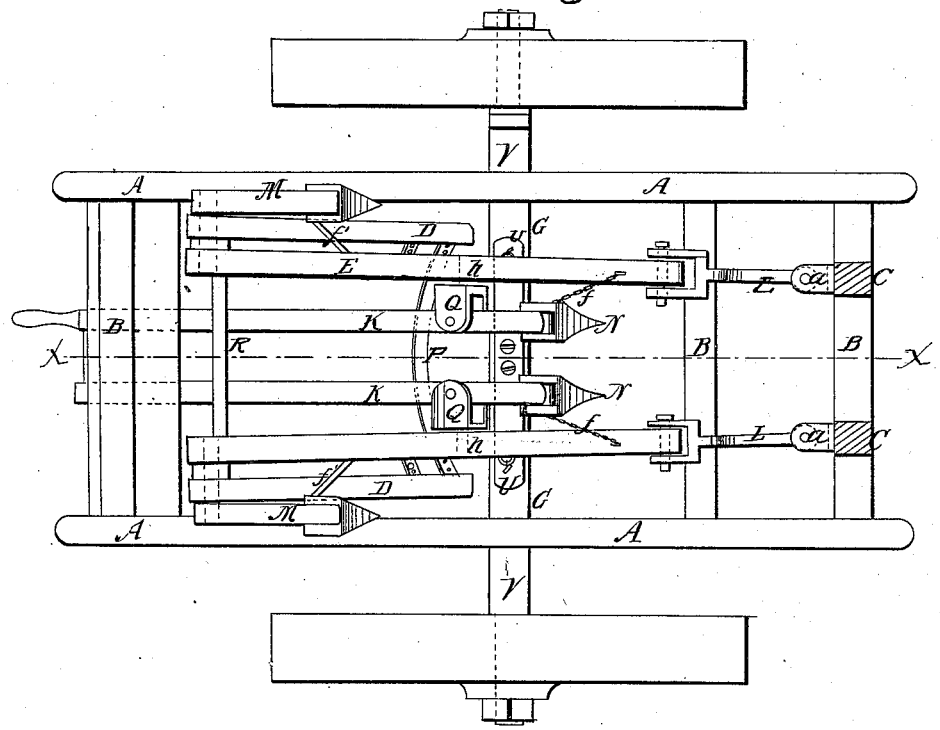

Figure 1 is a central vertical section of my improved cultivator through the line $x\,x$, Fig. 2. Fig. 2 is a bottom view of the cultivator.

Similar letters of reference indicate corresponding parts.

This invention relates to "riding-cultivators," so called; and it consists of the combination of novel devices with the certain mechanism which was before employed in the construction of cultivators, as will be fully set forth in the following, and shown in the accompanying plate of drawings.

The general frame of the machine is shown at A and B. This frame is bolted to the cross-beam G, which latter is supported by the iron axle-uprights V, as shown.

The front plows are shown at N N, and are affixed to the plow-standards K K, which latter are pivoted in the lug-plates Q Q. These lug-plates are provided with shanks, which work within the plow-beams E E, as shown by the dotted lines at $h\,h$, whereby the plows N N are swung laterally to avoid obstacles, and are also held in a more yielding manner.

The forward ends of the plow-beams E E are attached to the frame-posts C C by the right-angle hinge-link L, as shown, which, by means of the bolts $a$ and $b$, lugs $d\,d$, and lug-plate $e$, enables the plow-beams E a lateral and vertical movement, for the purpose of conducing to the elastic action of the plows N N and shovels M M, and enabling the same to be deviated slightly from the line of draft, or to be lifted out of the soil, as circumstances may demand.

The plows M M are affixed to the standards J, which latter are held rigidly to the plow-beams E by the bolts $d$ and iron rods $f'$, as shown.

The spring U is bolted to the under side of the cross-beam G by bolts $j$ at the middle point thereof, and to the ends of this spring the chains I', which support the forward part of the beams E E and the plows N N, are attached. The office of this spring is to provide the requisite yielding motion to the plows N N in a vertical direction, and to permit the said plows rising out of the ground when one or both of the wheels of the cultivator pass over an elevation of the ground or obstacle thereon. This spring also conduces to the easy running of the plows N N by the yielding nature of this spring attachment.

The chains I connect the rear end of the plow-beams E E with the frame and with the front chains, I'.

Hinge-plates L L serve to suspend the plow-beams E E and plows and shovels N N and M M, respectively, in an elastic and easy swinging manner, which is highly conducive to the satisfactory performance of the cultivator.

The bars D D are pivoted to the beams E E, as shown, by the bolts $d$, which also hold the standards J J. These bars are connected by a curved spring, P, which yields sufficiently to allow the beams E E to spread when occasion requires, and yet holds the said beams generally parallel.

The chains I are attached to arms $k$ on the shaft R, as shown, by which means all the plows are lifted from the furrows when it is necessary to do so.

The handle H of the shaft R is held back by the catch $e'$ when the beams are lifted by the chains I.

By practical trial it has been demonstrated that a riding-cultivator constructed in the manner above shown will perform with an easy elastic motion, which is requisite to accomplish good results, and is, moreover, easily managed in cultivating corn, where skill and care are requisite to avoid damaging the corn.

I claim as new and desire to secure by Letters Patent—

1. The right-angle hinges L L, in combination with the beams E E, plows N N, shovels M M, and chains I I' of a riding-cultivator, all substantially as and for the purpose shown and described.

2. The spring U, chains I', when combined with the cross-beam or axle-beam G of a cultivator, and the plow-beams E, all substantially as shown and described, and for the purpose set forth.

The above specification of my invention signed by me this 18th day of November, 1867.

JOHN J. ROSE.

Witnesses:
 H. P. TRACY,
 Q. M. FARRAR.